(12) United States Patent
Miyajima et al.

(10) Patent No.: US 10,687,399 B2
(45) Date of Patent: Jun. 16, 2020

(54) CONSTANT CURRENT DRIVE CIRCUIT

(71) Applicant: NEW JAPAN RADIO CO., LTD., Chuo-ku, Tokyo (JP)

(72) Inventors: Kazuyuki Miyajima, Fujimino (JP); Mitsuhiro Enomoto, Fujimino (JP)

(73) Assignee: NEW JAPAN RADIO CO., LTD., Tokyo (JP)

( * ) Notice: Subject to any disclaimer, the term of this patent is extended or adjusted under 35 U.S.C. 154(b) by 0 days.

(21) Appl. No.: 16/431,522

(22) Filed: Jun. 4, 2019

(65) Prior Publication Data

US 2019/0380180 A1 Dec. 12, 2019

(30) Foreign Application Priority Data

Jun. 8, 2018 (JP) .................................. 2018-109933

(51) Int. Cl.
*H05B 45/37* (2020.01)
*H02M 1/08* (2006.01)
*H05B 45/10* (2020.01)

(52) U.S. Cl.
CPC .............. *H05B 45/37* (2020.01); *H02M 1/08* (2013.01); *H05B 45/10* (2020.01)

(58) Field of Classification Search
CPC ........ H05B 45/37; H05B 45/10; H05B 45/36; H05B 45/345; H05B 45/34; H05B 45/327; H05B 45/325; H05B 45/32; H05B 45/305; H05B 45/30; H05B 45/14; H05B 45/00; H05B 47/00; H05B 47/10; H05B 47/105; H05B 47/14; H05B 47/16; H05B 47/17; H05B 47/20; H05B 47/24; H05B 47/25
USPC .... 327/108–112, 427, 434, 437; 326/82, 83, 326/87
See application file for complete search history.

(56) References Cited

U.S. PATENT DOCUMENTS

| | | | |
|---|---|---|---|
| 7,576,574 B2 * | 8/2009 | Noda | H05B 33/0812 327/108 |
| 2015/0305118 A1 * | 10/2015 | Beghelli | H05B 37/0218 315/158 |

FOREIGN PATENT DOCUMENTS

| | | | |
|---|---|---|---|
| JP | 2012-164746 A | | 8/2012 |
| JP | 2012164746 A | * | 8/2012 |
| JP | 2018197975 A | * | 12/2018 |

* cited by examiner

*Primary Examiner* — Tomi Skibinski
(74) *Attorney, Agent, or Firm* — Procopio, Cory, Hargreaves & Savitch LLP

(57) ABSTRACT

Provided is a constant current drive circuit that can improve accuracy of a stop timing of quick charge and prevent an overshoot, an insufficient quick charge, and the like from occurring. The constant current drive circuit includes a resistor R5 connected between the output side of the gm amplifier 6 and the input side of the transistor M1. The comparator 9 serving as a charge stopping circuit includes a voltage Vof, and stops charging by the quick charge circuit 8 based on a comparison result of the voltage Vof and the voltage Vs2 generated in the resistor R5.

5 Claims, 5 Drawing Sheets

CONSTANT CURRENT DRIVE CIRCUIT

CROSS REFERENCE TO RELATED APPLICATIONS

This application claims priority from Japanese Patent Application No. 2018-109933 filed on Jun. 8, 2018, the entire contents of which are incorporated herein by reference.

BACKGROUND OF THE INVENTION

Field of the Invention

The present invention relates to a constant current drive circuit suitable for PWM dimming of an LED element.

Description of Related Art

When an LED element is used as, for example, a backlight of a liquid crystal display device, a current flowing to the LED element is controlled to be constant when luminance of the LED element is controlled to be constant. When being adjusted to an arbitrary brightness, the LED element is controlled to be ON/OFF at a frequency of hundreds of Hz or more, and PWM dimming is performed to change a ratio of time when the LED element is on and time when the LED element is off.

FIG. 6 shows an LED drive circuit that performs PWM dimming, which is realized by a constant current drive circuit. In FIG. 6, 1 is a power supply terminal of a voltage Vdd, 2 is a ground terminal of a voltage Vss (=0 V), 3 is an output terminal, 4 is an input terminal of a PWM signal, and 5 is an LED element.

In this LED drive circuit, when an NMOS transistor M1 is turned ON, a PMOS transistor M2 is turned ON, and an output current Iout flows from the output terminal 3 to the LED element 5. The output current Iout is detected by a resistor R1 as a voltage Vs1, and the voltage Vs1 is input to a non-inverting input terminal of a gm amplifier (transconductance amplifier) 6. A reference voltage Vref1, which is generated by a reference current Iref of a current source 7 by flowing to a resistor R2, is applied to an inverting input terminal of the gm amplifier 6. R3 is a bias resistor of the transistor M2, R4 is a bias resistor of the transistor M1, and C1 is a capacitor for phase compensation that is connected to a gate of the transistor M1.

When the output current Iout flowing to the resistor R1 increases, the voltage Vs1 decreases and a voltage of the non-inverting input terminal of the gm amplifier 6 decreases. When the voltage of the non-inverting input terminal is lower than the reference voltage Vref1, the gm amplifier 6 discharges an electric charge of the capacitor C1, and thus a gate voltage Vg1 of the transistor M1 decreases. Accordingly, a gate voltage of the transistor M2 increases, and a negative feedback operation is performed in which the output current Iout decreases. On the contrary, when the output current Iout flowing to the resistor R1 decreases, the voltage Vs1 increases and the voltage of the non-inverting input terminal of the gm amplifier 6 increases. When the voltage of the non-inverting input terminal is higher than the reference voltage Vref1, the gm amplifier 6 charges an electric charge to the capacitor C1, and thus the gate voltage Vg1 of the transistor M1 increases. Accordingly, the gate voltage of the transistor M2 decreases, and a negative feedback operation is performed in which the output current Iout increases.

With such a negative feedback operation, the output current Iout flowing to the turned-on LED element 5 is controlled to a constant value corresponding to the reference voltage Vref1. In this stable state, the following formula is satisfied.

$$Iout \times R1 = Iref \times R2 \qquad (1)$$

The output current Iout at this time is expressed by the following Formula (2).

$$Iout = Iref \times \frac{R2}{R1} \qquad (2)$$

The above is operation when a PWM voltage Vpwm of the input terminal 4 is in a state of "L" and an NMOS transistor M3 is OFF.

When the PWM voltage Vpwm is "H", the transistor M3 is turned ON, and an electric charge of the capacitor C1 is discharged. Accordingly, the voltage Vg1 decreases and the transistor M1 is turned OFF. Accordingly, the transistor M2 is also turned OFF, the output current Iout does not flow, and the LED element 5 is turned off. When the PWM voltage Vpwm of the input terminal 4 is "L" again, the transistor M3 is turned OFF. When the capacitor C1 is charged by an output current of the gm amplifier 6 and the voltage Vg1 reaches a threshold Vth1 of the transistor M1, the transistor M1 is turned ON, the transistor M2 is also turned ON, and the output current Iout starts flowing to and turns on the LED element 5 again.

When PWM dimming is performed, an influence of a time delay required for a rise of the LED element 5 from an off state to a on state increases when time during which the LED element 5 is on is short. For this reason, the LED element 5 does not reach luminance corresponding to a duty ratio of the PWM voltage Vpwm of the input terminal 4.

In order to prevent such a delay as described above, a current source 11 for quick charge is connected between the power supply terminal 1 and the capacitor C1, and the current source 11 is controlled to be ON/OFF by a comparator 12 for charge stop. The comparator 12 receives the voltage Vs1 at an inverting input terminal, and receives a voltage, as a reference voltage, obtained by adding a voltage Vchg to the reference voltage Vref1 at a non-inverting input terminal.

FIG. 7 shows an operation waveform diagram of the LED drive circuit in FIG. 6. When the PWM voltage Vpwm is "H" and the transistor M3 is ON and the LED element 5 is off, the output current Iout does not flow to the resistor R1, and the voltage Vs1 is the power supply voltage Vdd. Therefore, the current source 11 is controlled to be ON by the comparator 12 and a current Ichg flows through the turned-ON transistor M3.

When the PWM voltage Vpwm changes from "H" to "L" at a time point t0, quick charge of the capacitor C1 is started by the current Ichg of the turned-ON current source 11. With this charge, when the voltage Vg1 exceeds a threshold Vth (M1) of the transistor M1 at a time point t1, the transistor M1 is turned ON, the transistor M2 is also turned ON, and the output current Iout starts to flow. Since the capacitor C1 is charged quickly by the current Ichg in this manner, a rise of the gate voltage Vg1 is promoted, and it is possible to respond quickly to a change from "H" to "L" of the PWM voltage Vpwm.

When the transistor M2 is turned ON and the output current Iout starts to increase, the voltage Vs1 starts to decrease and an input voltage Vin of the gm amplifier 6 decreases accordingly. When the voltage Vs1 continues decreasing to "Vs1<(Vref1+Vchg)" and the comparator 12 is inverted, the current source 11 is controlled to be OFF and quick charge by the current Ichg is stopped. JP-A-2012-164746 discloses a circuit that performs the same operation as that of the circuit in FIG. 6.

[Patent Document 1] JP-A-2012-164746

According to a related art, a voltage generated in the resistor R2 needs to be small so as not to generate a large electric power in the resistor R1. Accordingly, a charge stop timing is likely to be affected by a variation in an offset voltage of the comparator 12. Accordingly, for example, when a stop timing of quick charge is delayed to a time point t2, an overshoot occurs as shown in FIG. 7, and luminance of the LED element 5 changes. On the contrary, when the stop timing is too early, quick charge may be insufficient, a startup timing may be delayed, and luminance of the LED element 5 may be insufficient.

SUMMARY

One or more embodiments provide a constant current drive circuit that is hardly affected by a variation in an offset voltage of a comparator and improves accuracy of a stop timing of quick charge.

(1) To achieve the above object, there is provided a constant current drive circuit that includes: an output transistor configured to drive a load to be ON/OFF; a transistor configured to drive the output transistor; a first resistor configured to detect a current flowing to the load and generate a first voltage; a first gm amplifier configured to receive the first voltage and a first reference voltage and control the output transistor so that the first voltage corresponds to the first reference voltage; a capacitor connected to an input side of the transistor configured to drive the output transistor; a PWM control transistor configured to turn ON/OFF the output transistor in accordance with a PWM signal; a quick charge circuit configured to charge the capacitor and accelerate a rise of operation of the output transistor when the load is switched from OFF to ON by the PWM control transistor; and a charge stopping circuit that is formed by a comparator and is configured to stop charging by the quick charge circuit. The constant current drive circuit includes a second resistor connected between an output side of the first gm amplifier and the capacitor. The charge stopping circuit includes a comparison voltage, and stops charging by the quick charge circuit based on a comparison result of the comparison voltage and a second voltage generated in the second resistor.

(2) In the constant current drive circuit according to (1), the charge stopping circuit includes a second gm amplifier formed on a same semiconductor substrate as the first gm amplifier, and the comparison voltage is generated by an output current of the second gm amplifier, the first transconductance amplifier includes a first transistor and a third resistance, the second transconductance amplifier includes a second transistor and a fourth resistance, the first transistor and the second transistor have the same property, and the third resistance and the fourth resistance have the same property.

(3) In the constant current drive circuit according to (2), the second gm amplifier receives a second reference voltage that generates the comparison voltage.

(4) In the constant current drive circuit according to (3), a ratio of the first reference voltage and the second reference voltage is constant.

(5) In the constant current drive circuit according to (3), a ratio of the first reference voltage and the second reference voltage is adjustable.

According to (1), an influence of a variation in an offset voltage of the comparator serving as the charge stopping circuit can be reduced. Accordingly, it is possible to improve accuracy of a stop timing of quick charge and prevent an overshoot, an insufficient quick charge, and the like from occurring. According to (2), an influence of transconductance of the first gm amplifier and a manufacturing variation as well as temperature characteristics of the second resistor and can be reduced. According to (3), the stop timing of quick charge can be adjusted. According to (4), the stop timing of quick charge can be constant regardless of a set value of an output current. According to (5), the stop timing of quick charge can be adjusted in accordance with a set value of an output current.

DESCRIPTION OF EMBODIMENTS

First Embodiment

Figure 1:
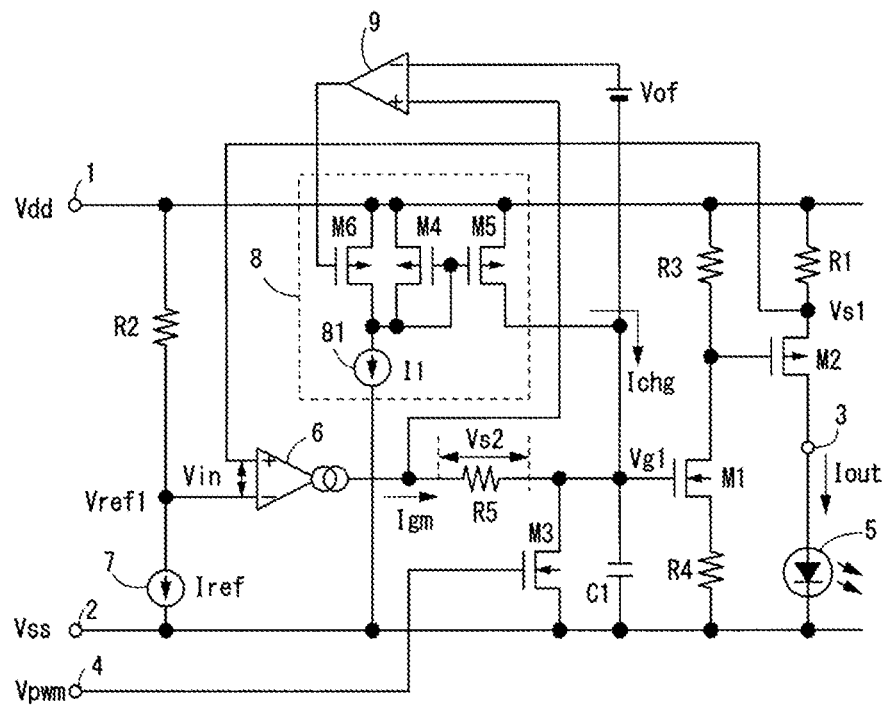
FIG. 1 is a circuit diagram of an LED drive circuit according to a first embodiment.
Figure 6:
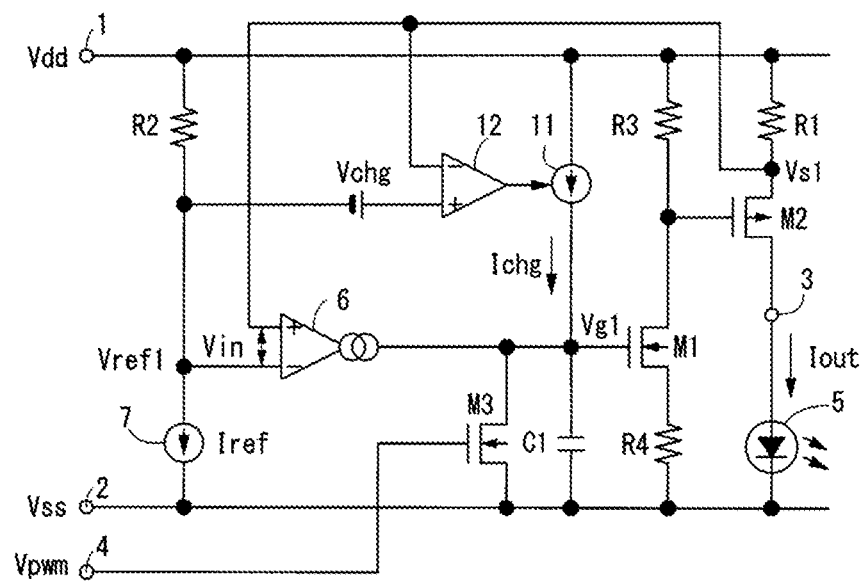
FIG. 6 is a circuit diagram of an LED drive circuit in the related art.
Figure 7:
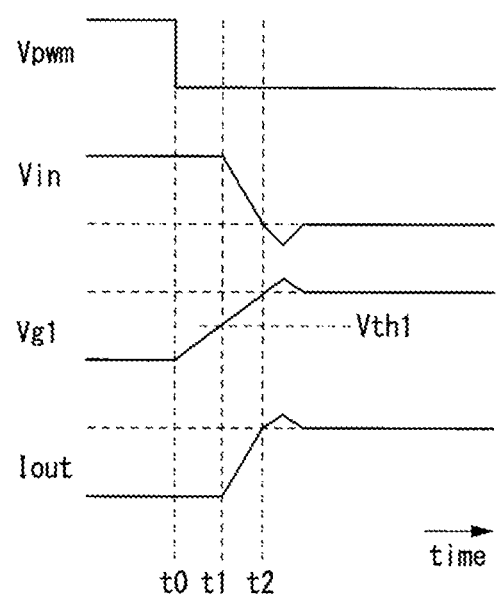
FIG. 7 is an operation waveform diagram of the LED drive circuit in FIG. 6.

FIG. 1 is an LED drive circuit according to the first embodiment, which is realized by a constant current drive circuit. The same components as those described in FIG. 6 are denoted by the same reference numerals. In this embodiment, in addition to the resistor R1, a resistor R5 is connected between an output side of the gm amplifier 6 and a gate of the transistor M1. 8 is a quick charge circuit, and includes current-mirror-connected PMOS transistors M4, M5, a PMOS transistor M6 connected in parallel to the transistor M4, and a current source 81 of a current I1. 9 is a comparator serving as a charge stopping circuit, in which an offset voltage Vof of the comparator 9 is compared with a voltage Vs2 generated in the resistor R5, and an output voltage is set to "H" when Vs2>Vof is satisfied.

The transistor M6 is controlled to be OFF when the output of the comparator 9 is "H", and thus the quick charge circuit 8 outputs the same current as the current I1 flowing to the transistor M4 as the charging current Ichg from the transistor M5. However, the transistor M6 is controlled to be ON when the output of the comparator 9 is "L", and thus the transistors M4, M5 are turned OFF, and an output of the charging current Ichg is stopped.

Figure 2:
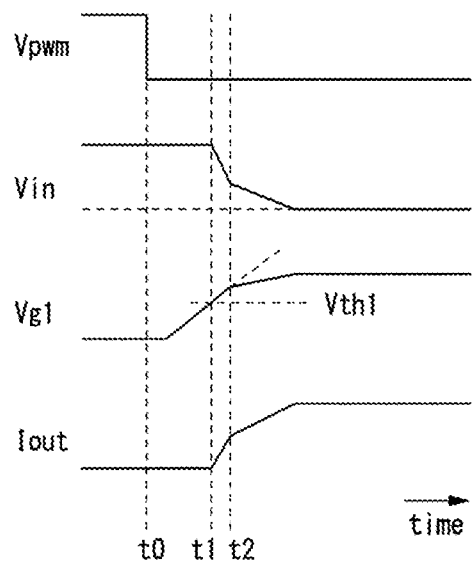
FIG. 2 is an operation waveform diagram of the LED drive circuit in FIG. 1.

FIG. 2 shows an operation waveform diagram of the LED drive circuit in FIG. 1. When the PWM voltage Vpwm is "H", the transistor M3 is turned ON, the transistor M1 is OFF, the transistor M2 is also turned OFF, and the LED element 5 is off. At this time, since the voltage Vs1 generated in the resistor R1 is the power supply voltage Vdd, an output current Igm of the gm amplifier 6 increases, the voltage Vs2 (=Igm×R5) generated in the resistor R5 increases, and Vs2>Vof is satisfied. Accordingly, the output of the comparator 9 is "H", the transistor M6 is turned OFF, the transistors M4, M5 are turned ON, and the current Ichg is output from the transistors M4, M5. The current Ichg flows to the turned-ON transistor M3, and the transistor M1 is not affected. Further, a charge of the capacitor C1 is discharged by the turned-ON transistor M3.

When the PWM voltage Vpwm changes from "H" to "L" at the time point t0, the transistor M3 is turned OFF, and thus the capacitor C1 is quickly charged by a current obtained by adding the current Ichg to the output current Igm of the gm amplifier 6. With this charge, at the time point t1 when the gate voltage Vg1 of the transistor M1 exceeds the threshold Vth (M1) of the transistor M1, the transistor M1 is turned ON, the transistor M2 is also turned ON, and the output current Iout starts to flow to the LED element 5. A rise of the gate voltage Vg1 of the transistor M1 is promoted with quick charge of the current Ichg in this manner, and it is possible to respond quickly to a change from "H" to "L" of the PWM voltage Vpwm.

When the output current Iout flowing to the LED element 5 increases, the voltage Vs1 starts to decrease. Accordingly, the input voltage Vin of the gm amplifier 6 also decreases, the output current Igm thereof decreases, and the voltage Vs2 generated in the resistor R5 also decreases. When Vs2=Vof is satisfied, the comparator 9 is inverted and an output thereof becomes "L", so that the transistor M6 is turned ON. Therefore, the transistors M4, M5 are turned OFF, an output of the current Ichg is stopped, and quick charge of the capacitor C1 is stopped. When a time point when Vs2=Vof is satisfied is the time point t2 shown in FIG. 2, an overshoot can be prevented, and an insufficient rise can also be prevented.

Here, when transconductance of the gm amplifier 6 is gm1, the voltage Vs2 generated in the resistor R5 is expressed by the following Formula (3).

$$Vs2 = Vin \times gm1 \times R5 \qquad (3)$$

When the current Ichg output from the quick charge circuit 8 is stopped, Vof=Vs2 is satisfied. Accordingly, when an input voltage of the gm amplifier 6 at this time is Vin(off), the voltage Vof is expressed by the following Formula (4).

$$Vof = Vin(off) \times gm1 \times R5 \qquad (4)$$

Therefore, the input voltage Vin(off) when the current Ichg stops is expressed by the following Formula (5).

$$Vin(off) = \frac{Vof}{gm1 \times R5} \qquad (5)$$

For example, when Vof=100 mV, gm1=1 µA/mV, and R5=10 kΩ are satisfied, Vin(off)=10 mV is satisfied. In case of this value, gain between an input and an output of the gm amplifier 6 is 10 times. In this case, since Vin(off)=10 mV is satisfied corresponding to Vof=100 mV, it is possible to reduce an influence of a variation in the offset voltage Vof at the time point t2 when quick charge is stopped to one tenth thereof. That is, the charge stop voltage Vin(off) does not vary greatly even in case of a certain variation in the offset voltage Vof. Therefore, it is possible to reduce an error (deviation from the time point t2) of a stop timing of the current Ichg due to a variation in the offset voltage Vof.

Further, the comparator 9 can have a simple circuit configuration, since detection accuracy required for the comparator 9 is low.

In this manner, an influence of a variation in the offset voltage Vof of the comparator 9 is reduced, and a stop timing of quick charge can be adjusted to the time point t2 with high accuracy. Therefore, it is possible to stop quick charge at an optimum timing, and to prevent an overshoot, an insufficient quick charge, and the like from occurring.

In this embodiment, a first reference voltage in the claims is realized by the reference voltage Vref1, an output transistor is realized by transistors M1, M2, a PWM control transistor is realized by the transistor M3, a first resistor is realized by the resistor R1, a second resistor is realized by R5, and a comparison voltage is realized by the offset voltage Vof.

Second Embodiment

Figure 3:
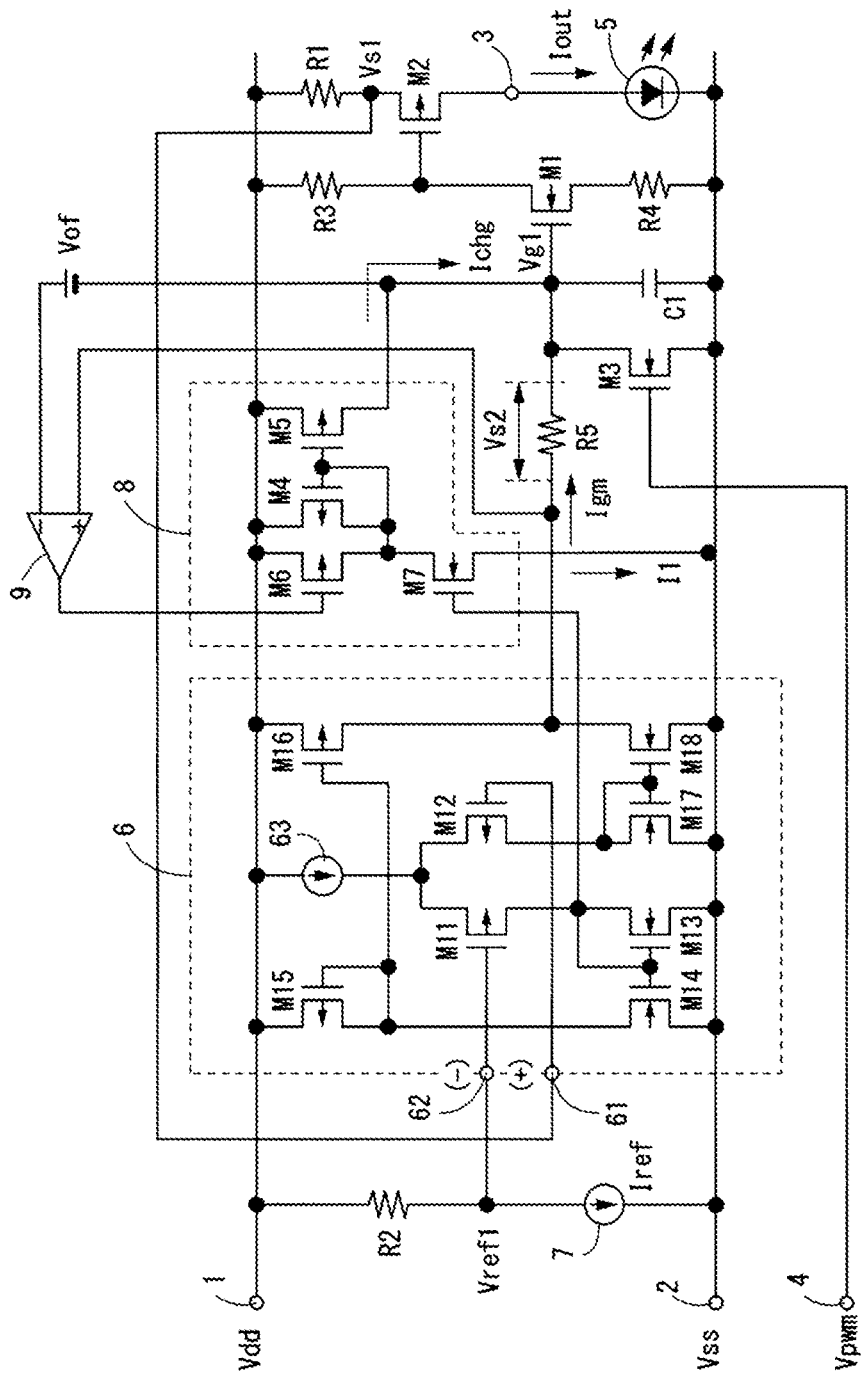
FIG. 3 is a circuit diagram of an LED drive circuit according to a second embodiment.

FIG. 3 is an LED drive circuit according to the second embodiment, and is a specific example of the gm amplifier 6. In the gm amplifier 6, M11 and M12 are differential-connected PMOS transistors whose gates are connected to a non-inverting input terminal 61 and an inverting input terminal 62 and whose sources are connected to a current source 63. M13, M14 are current-mirror-connected NMOS transistors that take out a drain current of the transistor M11. M15, M16 are current-mirror-connected PMOS transistors that take out a drain current of the transistor M14. M17, M18 are current-mirror-connected NMO transistors that take out a drain current of the transistor M12. A difference between a drain current of the transistor M16 and a drain current of the transistor M18 is the output current Igm of the gm amplifier 6. The current source 81 of the quick charge circuit 8 is formed of a transistor M7 to which the drain current of the transistor M11 is mirrored.

In the gm amplifier 6, the drain current of the transistor M11 is mirrored to transistors M13→M14→M15→M16, and the drain current of the transistor M12 is mirrored to the transistors M17→M18. Therefore, when the input voltage Vin input between the non-inverting input terminal 61 and the inverting input terminal 62 increases, the output current Iqm increases; when the input voltage Vin decreases, the output current Igm decreases.

In this embodiment, the drain current I1 of the transistor M7 serving as the current source 81 increases as the input voltage Vin increases. The input voltage Vin is maximized when the output current Iout does not flow, and thus the current I1 of the transistor M7 is maximized when the PWM voltage Vpwm changes from "H" to "L". Therefore, the current Ichg at a start of quick charge can be large, and a rise of turning on of the LED element 5 can be accelerated.

Third Embodiment

The transconductance gm1 of the gm amplifier 6 and the resistor R5 vary depending on a manufacturing variation and temperature. As a result, the voltage Vin(off) in Formula (5) also varies, and a timing of stopping the current Ichg also varies in the same manner. Therefore, in this embodiment, when the transconductance gm1 and the resistor R5 vary due to a temperature variation and a manufacturing variation, the input offset voltage Vof of the comparator 9 is varied in accordance with the variation, thereby preventing the timing of stopping the quick charge current Ichg from varying due to the temperature variation and the manufacturing variation.

Figure 4:
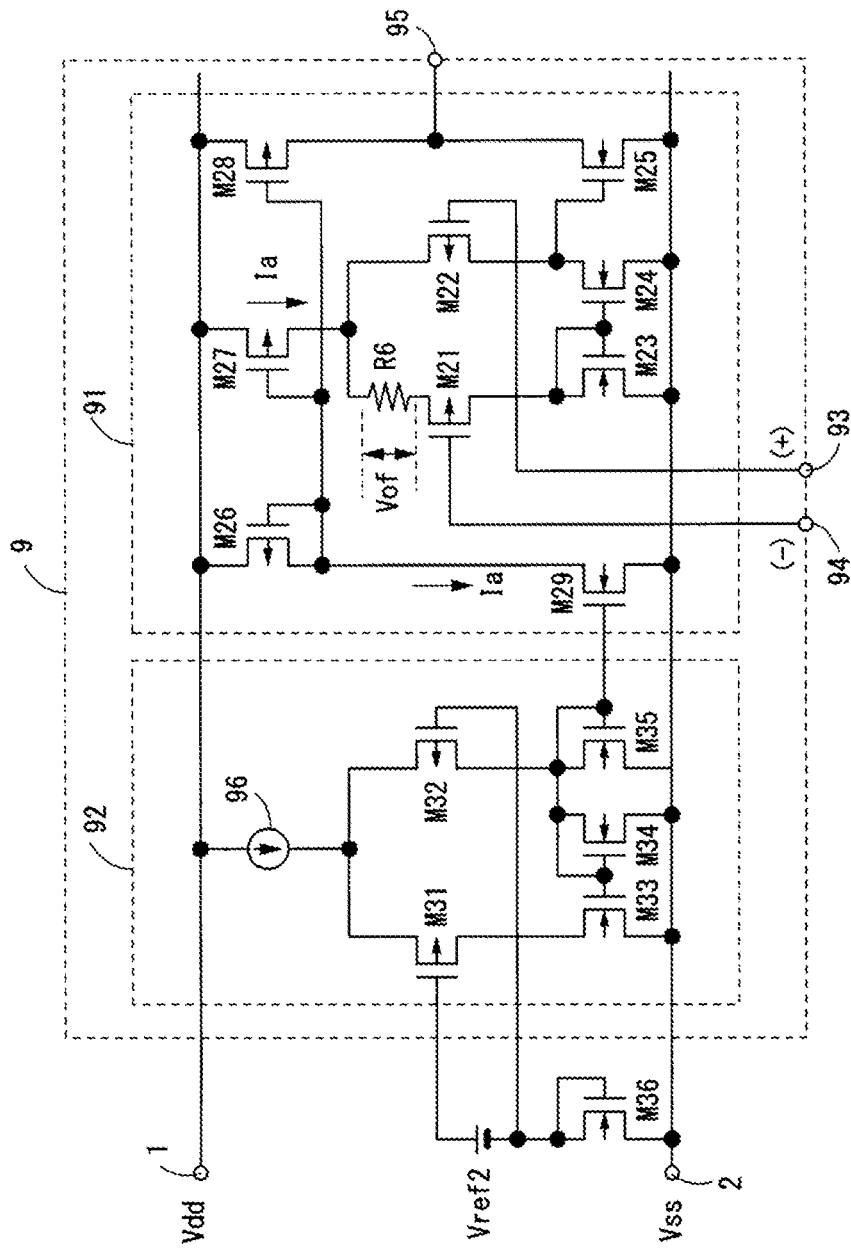
FIG. 4 is a circuit diagram of a comparator of an LED drive circuit according to a third embodiment.

FIG. 4 is a circuit showing a specific example of the comparator 9. The comparator 9 includes a comparator main body circuit 91 and a gm amplifier 92 that supplies a bias current Ia to the comparator main body circuit 91.

In the comparator main body circuit 91, M21, M22 are differential-connected PMOS transistors whose gates are connected to a non-inverting input terminal 93 and an inverting input terminal 94. A source of the transistor M21 whose gate is connected to the inverting input terminal 94 is connected to a resistor. R6 that generates the offset voltage Vof. M23, M24 are current-mirror-connected NMOS transistors serving as active loads of the transistors M21, M22. M25 is an NMOS transistor whose gate is connected to a drain of the transistor M22 and whose drain is connected to the output terminal 95. M26, M27, M28 are current-mirror-connected PMOS transistors, in which the transistor M27 supplies the bias current Ia to the differential-connected transistors M21, M22, and a drain of the transistor M28 is connected to the output terminal 95. The output terminal 95 is connected to a gate of the transistor M6 shown in FIGS. 1 and 3. M29 is an NMOS transistor that supplies the bias current Ia to the transistor M26, and is controlled by the gm amplifier 92.

In the gm amplifier 92, M31, M32 are PMOS differential-connected transistors in which a reference voltage Vref2 is applied between gates thereof and a current source 96 is connected to sources thereof. M33, M34 are current-mirror-connected NMOS transistors serving as active loads of the transistors M31, M32. M35 is an NMOS transistor that is current-mirror-connected to the transistor M29, and a drain current of the transistor M32 is mirrored to the transistor M29. M36 is an NMOS transistor in which a gate and a drain are connected in common, and is connected to raise the voltage Vref2 by a threshold voltage of the transistor M36. In this manner, the gm amplifier 92 has substantially the same circuit configuration as the gm amplifier 6. In this embodiment, a second reference voltage in the claims is realized by the reference voltage Vref2.

In this embodiment, the offset voltage Vof in FIGS. 1 and 2 is generated by a current flowing to the transistor M21 and the resistor R6 of the comparator main body circuit 91. When Vof=Vs2 is satisfied, the same current flows to the transistors M21, M22, and thus a current of half of the bias current Ia flowing to the transistor M27 flows to the resistor R6. Therefore, at this time, the offset voltage Vof generated in the resistor R6 is obtained by the following Formula (6).

$$Vof = R6 \times \frac{Ia}{2} \qquad (6)$$

When Formula (6) is substituted into the following Formula (5), the following Formula (7) is obtained.

$$Vin(\text{off}) = \frac{Ia}{2 \times gm1} \times \frac{R6}{R5} \qquad (7)$$

At this time, when the comparator main body circuit 91 and the gm amplifier 92 are formed on the same semiconductor substrate as the gm amplifier 6 and the resistor R5, the offset voltage Vof generated in the resistor R6 can be set to the same manufacturing variation and the same temperature characteristics as the voltage Vs2 obtained on an output side of the gm amplifier 6. Therefore, the manufacturing variation and the temperature characteristics of the offset voltage Vof can be cancelled as described below.

When transconductance of the gm amplifier 92 is gm2, the bias current Ia is obtained by the following Formula (8).

$$Ia = Vref2 \times gm2 \qquad (8)$$

When Formula (8) is substituted into Formula (7), the following Formula (9) is obtained.

$$Vin(\text{off}) = \frac{1}{2} \times \frac{gm2}{gm1} \times \frac{R6}{R5} \times Vref2 \qquad (9)$$

As described above, with the comparator main body circuit 91 and the gm amplifier 92 being formed on the same semiconductor substrate as the gm amplifier 6 and the resistor R5, the same temperature characteristics and the same manufacturing variation can be given to the resistors R6 and R5, and the same also applied to gm1 and gm2. Accordingly, a variation of the input voltage Vin(off) of the gm amplifier 6 due to a temperature variation and a manufacturing variation when the quick charge current Ichg is stopped can be reduced from Formula (9).

The voltage Vin(off) that stops quick charge is proportional to the voltage Vref2, and thus the timing of stopping quick charge can be adjusted by adjusting the voltage Vref2.

The reference voltage Vref2 serving as an input voltage of the gm amplifier 92 is a voltage corresponding to the reference voltage Vref1, and an advantage thereof will be described with reference to the comparator 9 in FIG. 5. Hereinafter, a set value of an output current supplied to an LED element 3 (output current when Vs1=Vref1 is satisfied) is Iout(con), and an output current when the quick charge circuit is stopped is Iout(chg-stop). As shown in FIG. 1, the reference voltage Vref1 is represented by a product of the current Iref of the current source 7 and the resistor R2, and is expressed by the following Formula (10).

$$Vref = Iref \times R2 \qquad (10)$$

When Formula (10) is substituted into Formula (2), a relationship between the set current Iout(con) and the reference voltage Vref1 can be expressed by the following Formula (11).

$$Iout(con) = \frac{VR1}{R1} \qquad (11)$$

The current Iout(chg-stop) will be described below. A potential difference VR1 generated in the resistor R1 when the quick charge circuit is stopped is expressed by the following Formula (12).

$$VR1 = Vref1 - Vin(\text{off}) \qquad (12)$$

The output current Iout(chg-stop) when the quick charge circuit is stopped can be expressed by division of values of the voltage VR1 and the resistor R1.

$$Iout(chg - \text{stop}) = \frac{VR1}{R1} \qquad (13)$$

When Formula (12) is substituted into Formula (13), the following Formula (14) is obtained.

$$Iout(chg-\text{stop}) = \frac{Vrfe1 - Vin(\text{off})}{R1} \quad (14)$$

A ratio Irate of the output current value Iout(chg–stop) when the quick charge circuit is stopped corresponding to the set value Iout(con) of the output current is expressed by following Formula (15).

$$Irate = \frac{Iout(chg-\text{stop})}{Iout(con)} \quad (15)$$

When Formulas (11) and (14) are substituted into Formula (15), the following Formula (16) is obtained.

$$Irate = \frac{\frac{Vref1 - Vin(\text{off})}{R1}}{\frac{Vref1}{R1}} = \frac{Vref1 - Vin(\text{off})}{Vref1} = 1 - \frac{Vin(\text{off})}{Vref1} \quad (16)$$

When Formula (9) is substituted into Formula (16), the following Formula (17) is obtained.

$$Irate = 1 - \frac{1}{2} \times \frac{gm2}{gm1} \times \frac{R6}{R5} \times \frac{Vref2}{Vref1} \quad (17)$$

Here, the ratio Irate when the set value Iout(con) of the output current is changed will be described. In such a constant current drive circuit, it is common to change the set value of the output current, the resistors R1, R2, and the reference current Iref. However, when the resistor R2 and the reference current Iref are changed, as shown in Formula (10), the reference voltage Vref1 changes.

When the reference voltage Vref2 is a constant independent of the reference voltage Vref1, the ratio Irate changes according to a variation of the reference voltage Vref1 since other items in Formula (17) including gm1, gm 2, R5, and R6 are constants. The change in the ratio Irate means a change of a time point when the quick charge circuit is stopped, and an overshoot or insufficient quick charge may occur according to the set value of the output current.

Therefore, since the second reference voltage Vref2 is a voltage corresponding to the first reference voltage Vref1, the quick charge circuit is stopped at an optimum timing so that the ratio Irate is controlled to be a constant value.

Figure 5:
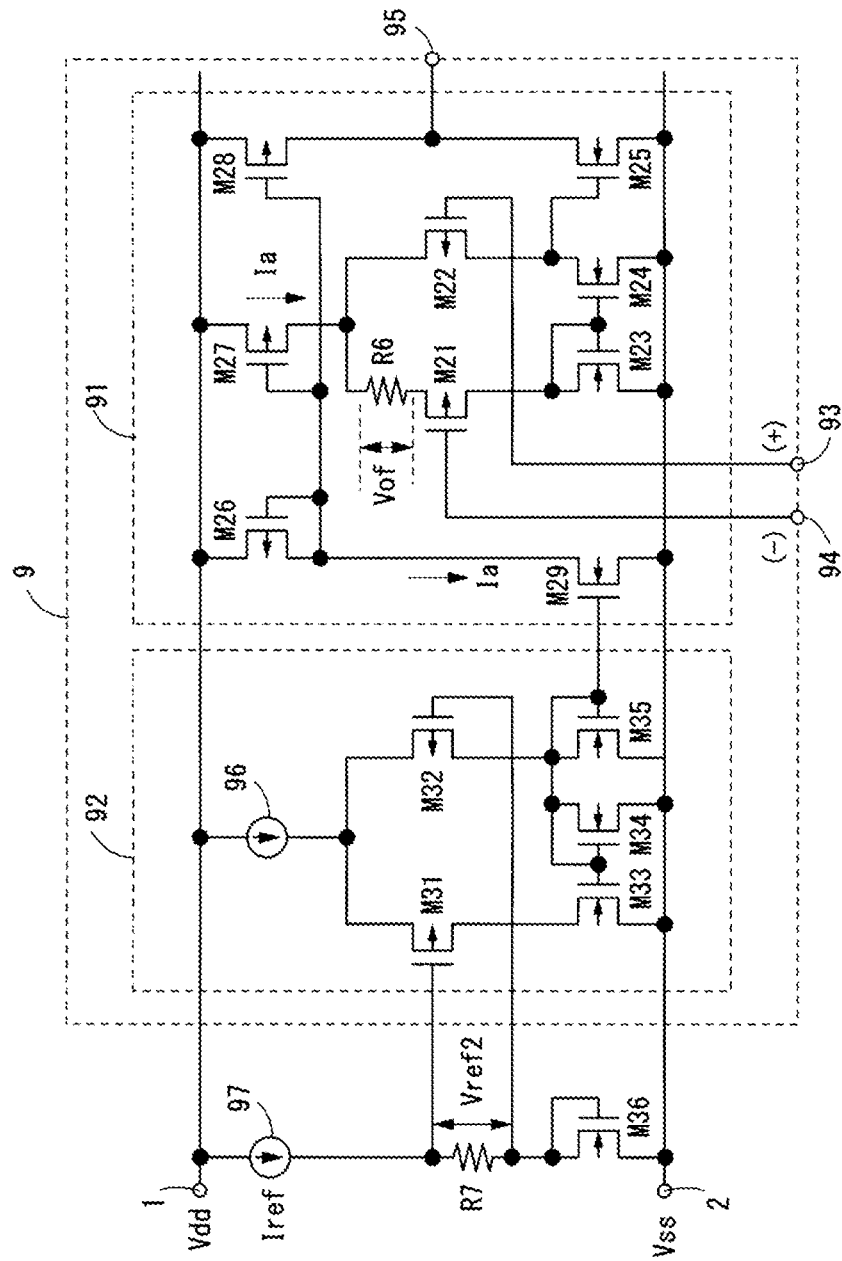
FIG. 5 is a circuit diagram of another comparator of the LED drive circuit according to the third embodiment.

The reference voltage Vref2 may be set to a voltage corresponding to the reference voltage Vref1, for example, as is shown in FIG. 5. The circuit in FIG. 5 works effectively when the set value Iout(con) of the output current is changed, since the current source 97 is used through which the same current as the current Iref of the current source 7 in FIG. flows. The reference voltage Vref2 is generated since the current Iref of the current source 97 flows to the resistor R7.

$$Vref2 = Iref \times R7 \quad (18)$$

When Formulas (9) and (18) are substituted into Formula (15), the following Formula (19) is obtained.

$$Irate = 1 - \frac{1}{2} \times \frac{gm2}{gm1} \times \frac{R6}{R5} \times \frac{R7}{R2} \quad (19)$$

All elements constituting Formula (19) are constants, and thus are possible to have a constant value regardless of the set value Iout(con) of the output current. That is, when a value of the resistor R2 is changed to change the set value Iout(con) of the output current, neither the ratio Irate or the time point when quick charge is stopped changes when a value of the resistor R7 is set such that a relationship of R7/R2 is the same.

Although the embodiment introduced an example in which the ratio Irate is constant regardless of the set value of the output current, a gate voltage of the transistor M1 when quick charge is stopped increases as the set value of the output current increases. That is, an amount of charges that must be charged in to capacitor C1, which is phase compensation capacitance, also increases and charging time becomes longer. Further, even when an overshoot of 10 mA occurs, the overshoot is 10% when the set current Iout(con) is 100 mA, and is 1% when the set current Iout(con) is 1 A.

That is, when the output current Iout is large, it is difficult to shorten the charging time, but a problem of overshoot is small. On the contrary, when the output current is small, it is easy to shorten the charging time, but a problem of overshoot is large. When the ratio Irate is increased, a total charging time is shortened, and an overshoot easily occurs accordingly, since time of quick charge extends.

Therefore, a stop timing of quick charge may be adjusted in accordance with a condition. For example, when the set value Iout(con) of the output current is large, that is, when the first reference voltage Vref1 is large, the ratio Irate is set to be large; on the contrary, when the set value Iout(con) of the output current is small, that is, when the first reference voltage Vref1 is small, the ratio Irate is set to be small.

What is claimed is:

1. A constant current drive circuit comprising:
   an output transistor configured to drive a load to be ON/OFF;
   a transistor configured to drive the output transistor;
   a first resistor configured to detect a current flowing to the load and generate a first voltage;
   a first transconductance amplifier configured to receive the first voltage and a first reference voltage and control the output transistor so that the first voltage corresponds to the first reference voltage;
   a capacitor connected to an input side of the transistor configured to drive the output transistor;
   a PWM control transistor configured to turn ON/OFF the output transistor in accordance with a PWM signal;
   a quick charge circuit configured to charge the capacitor and accelerate a rise of operation of the output transistor when the load is switched from OFF to ON by the PWM control transistor; and
   a charge stopping circuit that is formed by a comparator which stops charging by the quick charge circuit,
   a second resistor connected between an output side of the first transconductance amplifier and the capacitor,
   wherein the charge stopping circuit includes a comparison voltage, and stops charging by the quick charge circuit based on a comparison result of the comparison voltage and a second voltage generated in the second resistor.

2. The constant current drive circuit according to claim 1, wherein the charge stopping circuit includes a second transconductance amplifier formed on a same semiconductor substrate as the first transconductance amplifier, and
   wherein the comparison voltage is generated by an output current of the second transconductance amplifier, wherein the first transconductance amplifier includes a first transistor and a third resistance,
wherein the second transconductance amplifier includes a second transistor and a fourth resistance,
wherein the first transistor and the second transistor have the same property, and
wherein the third resistance and the fourth resistance have the same property.

3. The constant current drive circuit according to claim 2, wherein the second transconductance amplifier is configured to receive a second reference voltage that generates the comparison voltage.

4. The constant current drive circuit according to claim 3, wherein a ratio of the first reference voltage and the second reference voltage is constant.

5. The constant current drive circuit according to claim 3, wherein a ratio of the first reference voltage and the second reference voltage is adjustable.

\* \* \* \* \*